United States Patent
Hu et al.

(10) Patent No.: US 11,853,792 B2
(45) Date of Patent: Dec. 26, 2023

(54) BASELINE MONITORING METHOD AND APPARATUS, READABLE MEDIUM, AND ELECTRONIC DEVICE

(71) Applicant: BEIJING BYTEDANCE NETWORK TECHNOLOGY CO., LTD., Beijing (CN)

(72) Inventors: Xionghua Hu, Beijing (CN); Yue Shen, Beijing (CN); Shanshan Wang, Beijing (CN); He Meng, Beijing (CN); Guitao Ding, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/070,443

(22) Filed: Nov. 28, 2022

(65) Prior Publication Data

US 2023/0087168 A1   Mar. 23, 2023

Related U.S. Application Data

(63) Continuation of application No. PCT/CN2021/128180, filed on Nov. 2, 2021.

(30) Foreign Application Priority Data

Nov. 4, 2020  (CN) .......................... 202011218097.5

(51) Int. Cl.
*G06F 9/48* (2006.01)
*G06F 11/34* (2006.01)

(52) U.S. Cl.
CPC .......... *G06F 9/485* (2013.01); *G06F 11/3428* (2013.01)

(58) Field of Classification Search
CPC ...................................................... G06F 9/485
See application file for complete search history.

(56) References Cited

U.S. PATENT DOCUMENTS 8,046,297 B2 * 10/2011 Andreasen ............. G06Q 40/04
                                                        707/706
9,286,106 B1   3/2016 Huang
(Continued)

FOREIGN PATENT DOCUMENTS

CN    107241205 A    10/2017
CN    107526631 A    12/2017
(Continued)

OTHER PUBLICATIONS

International Patent Application No. PCT/CN2021/128180; Int'l Search Report; dated Jan. 26, 2022; 2 pages.
(Continued)

*Primary Examiner* — Charlie Sun
(74) *Attorney, Agent, or Firm* — BakerHostetler

(57) ABSTRACT

The present disclosure relates to a baseline monitoring method, apparatus, readable medium, and electronic device. The method includes: determining a plurality of tasks to be monitored in the baseline; determining whether there is a first task to be monitored that has cyclic dependency according to dependencies among the plurality of tasks to be monitored; and determining a task instance to be checked for each of the tasks to be monitored, and for the first task to be monitored that is not a guaranteed task, determining the task instance to be checked for the first task to be monitored according to the cyclic dependency and dependency between the first task to be monitored and its downstream task to be monitored.

20 Claims, 4 Drawing Sheets

(56) References Cited

U.S. PATENT DOCUMENTS

| 10,747,544 B1 | 8/2020 | Balasubramanian et al. |
| 2018/0048532 A1 | 2/2018 | Poort et al. |
| 2020/0104231 A1 | 4/2020 | Vigderovich et al. |

FOREIGN PATENT DOCUMENTS

| CN | 109558292 A | 4/2019 |
| CN | 109684229 A | 4/2019 |
| CN | 110413483 A | 11/2019 |
| CN | 110837457 A | 2/2020 |
| CN | 111427748 A | 7/2020 |
| CN | 111736969 A | 10/2020 |
| CN | 112328377 A | 2/2021 |

OTHER PUBLICATIONS

European Patent Application No. 21888545.7; Extended Search Report; dated Sep. 20, 2023; 13 pages.

* cited by examiner

BASELINE MONITORING METHOD AND APPARATUS, READABLE MEDIUM, AND ELECTRONIC DEVICE

CROSS-REFERENCE TO RELATED APPLICATIONS

This application is a continuation of PCT/CN2021/128180 filed Nov. 2, 2021 which claims priority to Chinese Patent Application No. 202011218097.5 filed Nov. 4, 2020, entitled "BASELINE MONITORING METHOD AND APPARATUS, READABLE MEDIUM, AND ELECTRONIC DEVICE", the entire contents of which are incorporated herein by reference.

TECHNICAL FIELD

The present disclosure relates to the field of computer technologies, and in particular, to a baseline monitoring method, apparatus, readable medium, and electronic device.

BACKGROUND

In big data development scenarios, there are many tasks of running and maintenance management. In order to effectively operate and maintain routine tasks and ensure the normal output of transaction data, it is necessary to monitor the running of tasks.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

In a first aspect, the present disclosure provides a baseline monitoring method, comprising: determining a plurality of tasks to be monitored in the baseline; determining whether there is a first task to be monitored that has cyclic dependency according to dependencies among the plurality of tasks to be monitored, wherein the cyclic dependency indicates mutual dependency among the first tasks to be monitored; determining a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and for each of the tasks to be monitored, monitoring the baseline according to the task instance to be checked for the task to be monitored.

In a second aspect, the present disclosure provides a baseline monitoring apparatus, comprising: a determination module for tasks to be monitored configured to determine a plurality of tasks to be monitored in the baseline; a cyclic dependency determination module configured to determine whether there is a first task to be monitored that has cyclic dependency according to dependencies among the plurality of tasks to be monitored, wherein the cyclic dependency indicates mutual dependency among the first tasks to be monitored; a task instance determination module configured to determine a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added by a user to the baseline; a monitoring module configured to, for each of the tasks to be monitored, monitor the baseline according to the task instance to be checked for the task to be monitored.

In a third aspect, the present disclosure provides a computer-readable medium with a computer program stored thereon, which, when executed by a processing apparatus, implements the steps of the method provided in the first aspect of the present disclosure.

In a fourth aspect, the present disclosure provides an electronic device, comprising: a storage apparatus with a computer program stored thereon; and a processing apparatus for executing the computer program in the storage apparatus, so as to implement the steps of the method provided in the first aspect of the present disclosure.

In a fifth aspect, the present disclosure provides a computer program comprising instructions that, when executed by a processor, cause the processor to perform the steps of the baseline monitoring method provided by the first aspect of the present disclosure.

In a sixth aspect, the present disclosure provides a computer program product comprising instructions that, when executed by a processor, cause the processor to perform the steps of the baseline monitoring method provided by the first aspect of the present disclosure.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings.

DETAILED DESCRIPTION

Figure 1:
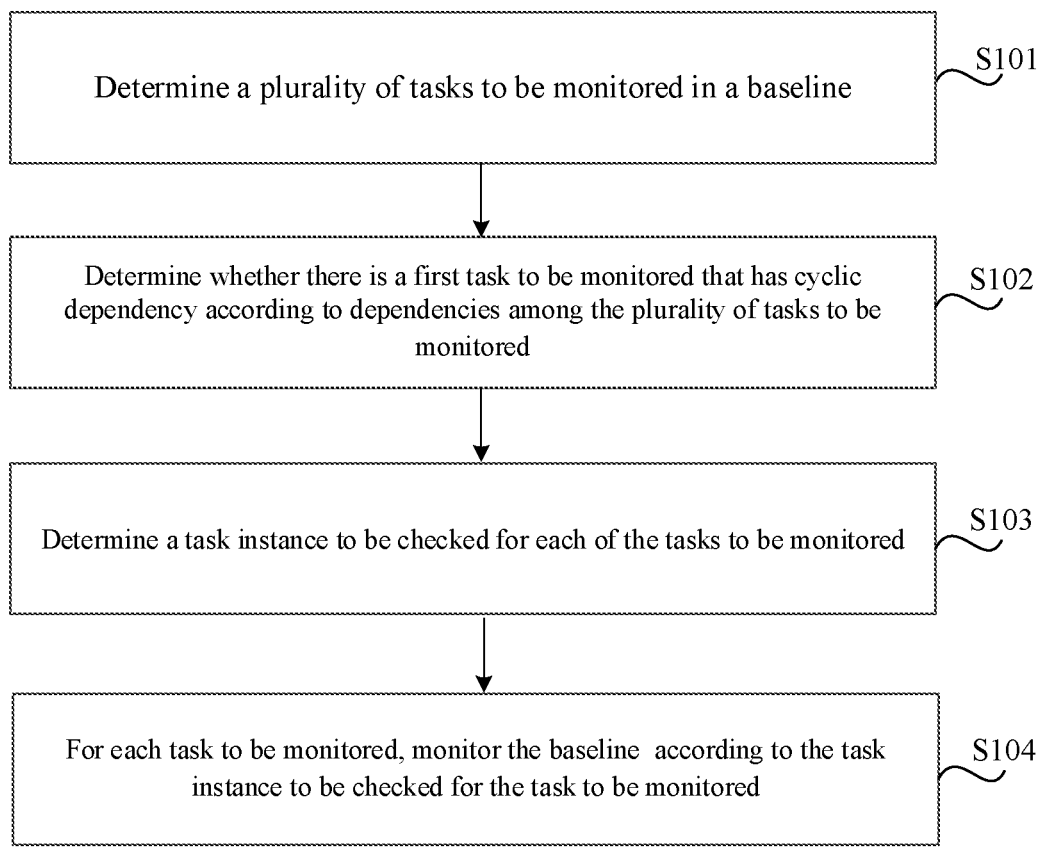
FIG. 1 is a flow chart of a baseline monitoring method according to an exemplary embodiment.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "an embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc., mentioned in the present disclosure are only used to distinguish between different apparatuses, modules or units, and are not used to limit the order of functions performed by these apparatuses, modules or units or their mutual dependencies.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

There are upstream and downstream dependencies among tasks. Usually, there are a large number of tasks and the dependencies are complex, such as cyclic dependency between tasks. Cyclic dependency refers to mutual dependency among tasks. For tasks with complex dependencies, how to perform effectively monitoring is an important issue in running and maintenance management.

With the technical solution of the present disclosure, according to dependencies among a plurality of tasks to be monitored in a baseline, in a case that it is determined that there is a first task to be monitored that has cyclic dependency, when determining a task instance to be checked for each of the tasks to be monitored, for the first task to be monitored that is not a guaranteed task, the task instance to be checked can be determined according to the cyclic dependency and dependency between the first task to be monitored and downstream task to be monitored. After the task instance to be checked is determined, cyclic process between the first task to be monitored can no longer be performed, so as to avoid the cycle dependency from entering a process of continuous circulating. For a second task to be monitored that is not a guaranteed task, the task instance to be checked can be determined according to dependency between the second task to be monitored and a downstream task to be monitored. Wherein the guaranteed task can be tasks added to the baseline by a user. For a guaranteed task, the latest task instance can be determined as the task instance to be checked. For a task to be monitored that is not a guaranteed task, its latest task instance which is depended on can be determined as the task instance to be checked. In this way, only a task instance to be checked is checked, and there is no need to check an earlier task instance repeatedly to avoid repeated check. In addition, the running situation of the task instance to be checked affects the overall status of the baseline, and by checking the task instance to be checked, the baseline can be effectively monitored, so that routine tasks can be effectively operated and maintained to ensure the normal running of tasks and the normal output of transaction data.

Other features and advantages of the present disclosure will be described in detail later.

FIG. 1 is a flowchart of a baseline monitoring method according to an exemplary embodiment. The method can be applied to an electronic device with processing capability. As shown in FIG. 1, the method can comprises S101-S104.

In S101, a plurality of tasks to be monitored in the baseline are determined.

The baseline can be a link of full tasks based on dependencies. Dependencies are upstream and downstream dependencies among tasks. A downstream task depends on execution of its upstream task. That is, the downstream task needs to wait for its upstream task to execute successfully before it can be executed. The types of baselines may include daily baselines and hourly baselines. For the daily baselines, detections are performed every day, and for the hourly baselines, detections are performed every hour.

Wherein depending on the scheduling frequency, the types of tasks may include daily tasks and hourly tasks. Daily tasks are scheduled every day, for example, at 8 o'clock every day, and hourly tasks are scheduled every hour, for example, at the 20th minute of every hour.

Users can add a task that needs to be guaranteed to a baseline, and a guaranteed task is a task that users add to the baseline. For example, a guaranteed task can be added to the baseline according to identification information of the guaranteed task (such as task name, task ID, etc.). As an example, a guaranteed task may be a task with a relatively high degree of importance, or may be a task that outputs important information. As to the number of guaranteed tasks added to a baseline by a user, it may be one or more, which is not specifically limited in this disclosure. It is to be noted that, for a daily baseline, users can add a guaranteed task with day-period, and for a hourly baseline, users can add a guaranteed task with hourly-period.

In the present disclosure, a plurality of tasks to be monitored in the baseline can be determined according to the guaranteed task added to the baseline by the user. There are upstream and downstream dependencies among tasks. Whether a downstream task can be successfully executed depends on whether its upstream task is successfully executed. Since the successful execution of a guaranteed task depends on the execution of all upstream tasks of the guaranteed task, both the guaranteed task and all the upstream tasks of the guaranteed task can be regarded as tasks to be monitored.

Figure 2:
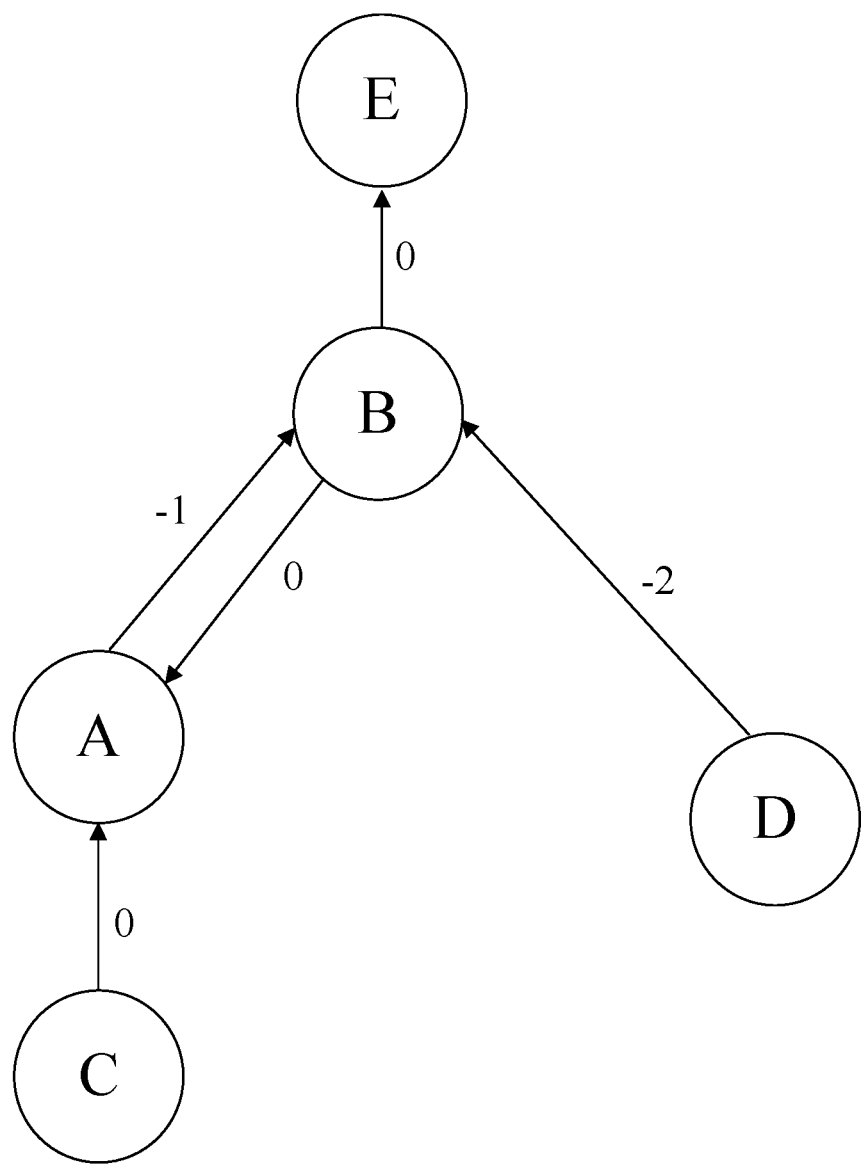
FIG. 2 is a schematic diagram showing dependencies among tasks according to an exemplary embodiment.

FIG. 2 is a schematic diagram showing dependencies among tasks according to an exemplary embodiment, wherein the direction pointed by the arrow is the task which is depended on. As shown in FIG. 2, for example, a user adds task C and task D as guaranteed tasks to a baseline, and the upstream tasks of task C include task A, task B and task E, and the upstream tasks of task D include task B and task E, then task A, task B, task C, task D, and task E may all be determined as tasks to be monitored. In addition, a guaranteed task added by a user to a daily baseline can be a daily task, whose upstream tasks can also include hourly tasks; and a guaranteed task added by a user to a hourly baseline can be an hourly task, whose upstream tasks can also include daily tasks.

It should be noted that, in the following introduction, taking the schematic diagram shown in FIG. 2 as an example for explanation, but it does not constitute a limitation to the implementation of the present disclosure. In practical applications, the number of tasks and the dependencies among tasks and the like are not limited to this.

In S102, it is determined whether there is a first task to be monitored that has cyclic dependency according to the dependencies among the plurality of tasks to be monitored.

Wherein the cyclic dependency indicates mutual dependency among the first tasks to be monitored. As shown in FIG. 2, as is known according to the dependencies among the plurality of tasks to be monitored, task A to be monitored depends on task B to be monitored, and task B to be monitored also depends on task A to be monitored, that is, the two are mutual dependent. Then, it can be determined that there are the first task A to be monitored and the first task B to be monitored that have cyclic dependency in the baseline.

It is to be noted that the cyclic dependency may be the mutual dependency between at least two tasks. For example, it could also be the mutual dependency among three tasks or four tasks. In the schematic diagram shown in FIG. 2, only taking the mutual dependency between two tasks as an example for explanation, it does not constitute a limitation to the implementations of the present disclosure.

In S103, a task instance to be checked for each of the tasks to be monitored is determined.

First, a task instance is introduced. A task instance may include a task and transaction time. The transaction time refers to the time to generate the data required for the running of the task to be monitored. The running process of the task instance can also be regarded as the execution process of the task. In the present disclosure, for example, a task instance to be run on the next day can be generated at a preset time every day. Wherein for a hourly task, 24 task instances will be run every day, that is, including task instances from 0 o'clock to 23 o'clock.

Wherein the task needs to process data during the execution process. For daily tasks, data generated on which day being run and processed is a task instance of that day being run and processed on a current day. As an example, for example, a task processes on July 26th the data generated on July 25th. These data were generated on July 25th, so the transaction time is July 25th. That is, what is run on July 26th is the task instance on July 25th. Similarly, for hourly tasks, data generated in which hour being run and processed is a task instance of that hour being run in a current hour. As an example, for example, what is run and processed at 15 o'clock is the data generated at 14 o'clock, then at 15 o'clock, the task instance of 14 o'clock is run.

A task instance to be checked refers to a task instance needed to be checked at a checking time point, and a baseline can be monitored by checking the running situation of the task instance.

In the present disclosure, for the task to be monitored as a guaranteed task, in order to ensure the current successful execution of the guaranteed task, the task instance to be checked for the task to be monitored can be determined according to the latest task instance for the task to be monitored. For example, the latest task instance can be regarded as its task instance to be checked, because earlier task instances have been checked before, and there is no need to repeat the check. Wherein the latest task instance may refer to the task instance with the latest transaction time. For daily tasks, the latest task instance is the task instance for the previous day. For example, on July 26, the latest task instance is the task instance on July 25. For hourly tasks, the latest task instance is the task instance of the previous hour. For example, at 15 o'clock, the latest task instance is the task instance of 14 o'clock.

In the present disclosure, if it is determined in S102 that there is a first task to be monitored that has cyclic dependency, for the first task to be monitored that is not a guaranteed task, a task instance to be checked for the first task to be monitored is determined according to the cyclic dependency and dependency between the first task to be monitored and its downstream task to be monitored. As shown in FIG. 2, neither the first task A to be monitored nor the first task B to be monitored is a guaranteed task. For example, for the first task A to be monitored, a task instance to be checked for the first task A to be monitored can be determined according to the cyclic dependency between the first task A to be monitored and the first task B to be monitored, and the dependency between the first task A to be monitored and its downstream task C to be monitored. For the first task B to be monitored, a task instance to be checked for the first task B to be monitored can be determined according to the cyclic dependency between the first task B to be monitored and the first task A to be monitored, and the dependency between the first task B to be monitored and its downstream task D to be monitored.

For a second task to be monitored that is not a guaranteed task, a task instance to be checked for the second task to be monitored is determined according to dependency between the second task to be monitored and its downstream task to be monitored, wherein the second task to be monitored is a task to be monitored except the first task to be monitored. As shown in FIG. 2, tasks C, D and E to be monitored are second tasks to be monitored, wherein the tasks C and D to be monitored are guaranteed tasks, and the second task E to be monitored is not a guaranteed task. For the second task E to be monitored, the task instance to be checked can be determined according to dependency between the second task E to be monitored and downstream task to be monitored.

In S104, for each task to be monitored, the baseline is monitored according to the task instance to be checked for the task to be monitored.

Wherein a task instance to be checked can be determined according to dependencies among tasks, and the dependencies among tasks affect the overall running of each task on the baseline, and the running situation of the task instance to be checked affects the overall status of the baseline, so the baseline can be monitored by checking the running situation of the task instance.

With above technical solution, according to dependencies among a plurality of tasks to be monitored in a baseline, in a case that it is determined that there is a first task to be monitored that has cyclic dependency, when determining a task instance to be checked for each of the tasks to be monitored, for the first task to be monitored that is not a guaranteed task, the task instance to be checked can be determined according to the cyclic dependency and dependency between the first task to be monitored and downstream task to be monitored. After the task instance to be checked is determined, cycle process among the first task to be monitored can no longer be performed, so as to avoid the cycle dependency from entering a process of continuous circulating. For a second task to be monitored that is not a guaranteed task, the task instance to be checked can be determined according to dependency between the second task to be monitored and a downstream task to be monitored. Wherein the guaranteed task can be a task added to the baseline by a user. For a guaranteed task, the latest task instance can be determined as the task instance to be checked. For a task to be monitored that is not a guaranteed task, its latest task instance which is depended on can be determined as the task instance to be checked. In this way, only a task instance to be checked is checked, and there is no need to check an earlier task instance repeatedly to avoid repeated check. In addition, the running situation of the task instance to be checked affects the overall status of the baseline, and by checking the task instance to be checked, the baseline can be effectively monitored, so that routine tasks can be effectively operated and maintained to ensure the normal running of tasks and the normal output of transaction data.

In the present disclosure, determining a task instance to be checked for the first task to be monitored according to the cyclic dependency and dependency between the first task to be monitored and its downstream task to be monitored may comprise: determining a second task instance which is depended on for the first task to be monitored according to a first task instance for its upstream first task to be monitored on which the first task to be monitored depends, and offset information of a dependency offset between the upstream first task to be monitored when it is downstream of the first task to be monitored and the first task to be monitored; determining a latest task instance which is depended on for the first task to be monitored according to the second task instance and a task instance for the first task to be monitored on which its downstream task to be monitored depends, and determining the latest task instance as the task instance to be checked for the first task to be monitored.

First, the dependency offset is introduced. Dependency offset means that a task to be monitored depends on the historical execution situation of another task to be monitored, and offset information can be used to indicate the execution history at which time of another task to be monitored is depended on. As shown in FIG. 2, taking the task to be monitored being a daily task as an example, offset information of the dependency offset of task C to be monitored to task A to be monitored being 0 may indicate that the task C to be monitored depends on the execution situation in the current day of the task A to be monitored; offset information of the dependency offset of task A to be monitored to task B to be monitored being −1 may indicate that the task A to be monitored depends on the execution situation on the pervious day of the task B to be monitored. Hourly tasks are similar. Taking the task to be monitored being an hourly task as an example, according to the offset information, task C to be monitored depends on the execution situation in the current hour of task A to be monitored, and task A to be monitored depends on the execution situation in a previous hour of task B to be monitored. In addition, it should be noted that, above 0 and −1 are only an exemplary representation for offset information, and offset information can also be represented by discrete time points or time intervals. Taking hourly tasks as an example, for example, offset information that task C to be monitored depends on task A to be monitored being [−3, 0] may indicate that task A to be monitored depends on the execution situation of task C to be monitored in the past four hours. In addition, there can also be a hourly task at upstream of a daily task. For example, the daily task depends on the hourly task, and the offset information is 2 o'clock and 4 o'clock, that is, the daily task depends on the execution situation of the hourly task at 2 o'clock and 4 o'clock.

The process of determining a task instance to be checked will be introduced below. As shown in FIG. 2, firstly, taking the task to be monitored being a daily task as an example for explanation. For example, the current day is July 26, and task C to be monitored is a guaranteed task. It can be determined that the task instance thereof to be checked is the latest task instance, that is, the task instance on July 25. Similarly, the task D to be monitored is a guaranteed task, and the task instance thereof to be checked is the task instance on July 25.

For the first task A to be monitored, offset information of the dependency offset of the downstream task C thereof to be monitored to it is 0, that is, the task instance to be checked on July 25 for the task C to be monitored depends on the task instance on July 25 for the task A to be monitored.

There is cyclic dependency between the first task A to be monitored and the first task B to be monitored. When the first task A to be monitored is at downstream, offset information of the dependency offset to the upstream first task B thereof to be monitored is −1. That is, the first task instance for the upstream first task B to be monitored on which the task instance on July 25 for the first task A to be monitored depends is the task instance on July 24 for the first task B to be monitored. Due to the mutual dependency between the two, when the first task B to be monitored is at downstream, offset information of the dependent offset to the upstream first task A thereof to be monitored is 0, then according to the first task instance and the offset information, it can be determined that the second task instance for the first task A to be monitored on which the first task B to be monitored depends is the task instance on July 24 for the first task A to be monitored.

For the first task A to be monitored, since the dependency of task C to be monitored for it is the task instance on July 25, and the dependency of the first task B to be monitored for it is the task instance on July 24, then the latest task instance for the task A to be monitored which is depended on is the task instance on July 25, and the task instance on July 25 can be determined as the task instance to be checked for the first task A to be monitored. And, according to the cyclic dependency between the two, the task instance on July 24 for the first task A to be monitored determined at this time, on which the first task B to be monitored depends, is not the latest task instance for the first task A to be monitored, thereafter, the cyclic process between the two may no longer be performed. If the cyclic process between the two is continued, it can be determined that the task instance on July 24 for the first task A to be monitored depends on the task instance on July 23 for the first task B to be monitored, and the task instance on July 23 for the first task B to be monitored further depends on the task instance on July 23 for the first task A to be monitored, and the task instance on July 23 is even not the latest task instance for the first task A to be monitored, so the cyclic process between the two may no longer be continued.

For the first task B to be monitored, the task instance on July 25 for the first task A to be monitored depends on the task instance on July 24 for the first task B to be monitored. According to the cyclic dependency between the two, when the first task B to be monitored is at downstream, the first task instance of its upstream first task A to be monitored on which its task instance on July 24 depends is the task instance on July 24 for the first task A to be monitored, and then when the first task A to be monitored is at downstream, according to the first task instance and the offset information −1, it can be determined that the second task instance for the first task B to be monitored which is depended on is the task instance on July 23. In addition, offset information of the dependency offset of the downstream task D thereof to be monitored to it is −2, that is, the task instance to be checked on July 25 for the task D to be monitored depends on the task instance on July 23 for the task B to be monitored. In this way, since the task instance on July 23 is earlier than the task instance on July 24, it can be determined at this time that the latest task instance for the first task B to be monitored which is depended on is the task instance on July 24, and the cyclic process between the two may no longer be performed. If the cyclic process between the two is continued, the subsequently determined task instances on July 22, July 21, etc., for the first task B to be monitored, which are depended on, are even not the latest task instances.

With above technical solution, for the first task to be monitored that has cyclic dependency, the latest task for the first task to be monitored which is depended on can be determined according to the cyclic dependency and offset information of the dependency offset of the downstream task to be monitored to it, and the latest task instance is determined as the task instance to be checked for the first task to be monitored. After the task instance to be checked is determined, the circulating between the first task to be monitored may no longer be performed, so as to avoid the cyclic dependency from entering a process of continuous circulating, and thereafter, by checking the task instance to be checked, the baseline is monitored.

In the present disclosure, determining the task instance to be checked for the second task to be monitored according to the dependency between the second task to be monitored and its downstream task to be monitored may comprise: determining the latest task instance for the second task to be monitored which is depended on according to offset information of the dependency offset between the second task to be monitored and its downstream task to be monitored, and taking the latest task instance as the task instance to be checked for the second task to be monitored.

Wherein the second task to be monitored do not have cyclic dependency, so the task instance to be checked can be determined directly according to dependency between the second task to be monitored and the downstream task to be monitored. As shown in FIG. 2, for the second task E to be monitored, offset information of the dependency offset of its downstream task B to be monitored to it is 0, so the task instance on July 24 for task E to be monitored on which the task instance on July 24 for the second task B to be monitored depends on is the latest task instance of the second task E to be monitored, and the task instance on July 24 can be used as the task instance to be checked for the second task E to be monitored.

As shown in FIG. 2, the task instance on July 24 can be used as the task instance to be checked for the second task E to be monitored. If there is still another task F to be monitored (not shown in the figure) at downstream of the second task E to be monitored, and offset information of the dependency offset to the second task E to be monitored is 0, for example, the task instance to be checked for the task F to be monitored is the task instance on July 25, then the task instance depends on the task instance on July 25 for the second task E to be monitored, so it can be determined that the task instance on July 25 is the latest task instance for the second task E to be monitored which is depended on, and the task instance on July 25 can be determined as the task instance to be checked for the second task E to be monitored.

With above technical solution, according to offset information of the dependency offset between the second task to be monitored and downstream task thereof to be monitored, the latest task instance which is depended on for the second task to be monitored is determined, and the latest task instance is determined as the task instance to be checked. In this way, only the latest task instance needs to be checked, and there is no need to check an earlier task instance repeatedly, so as to monitor the baseline.

If the task to be monitored is an hourly task, as shown in FIG. 2, as an example, for example, the current time is 15 o'clock, for the task C to be monitored, as a guaranteed task, its task instance to be checked can be the latest task instance, that is, the task instance at 14 o'clock, and for the task D to be monitored, as a guaranteed task, its task instance to be checked can be the task instance at 14 o'clock. For the first task A to be monitored, according to the cyclic dependency between it and the first task B to be monitored, and dependency between the first task A to be monitored and its downstream task to be monitored, the latest task for the first task A to be monitored which is depended on can be determined to be the task instance at 14 o'clock, and the task instance at 14 o'clock can be used as the task instance to be checked for the first task A to be monitored. For the first task B to be monitored, according to the cyclic dependency between it and the first task A to be monitored, and dependency between the first task B to be monitored and its downstream task to be monitored, the task instance at 13 o'clock can be used as the task instance to be checked for the first task B to be monitored. For the second task E to be monitored, the task instance at 13 o'clock can be used as its task instance to be checked.

The process of determining a task instance to be checked is set forth in detail above, and the following will describe the process of determining check time information corresponding to the task to be monitored, that is, when the task instance to be checked should be checked.

The baseline monitoring method provided by the present disclosure may further comprise: determining check time information corresponding to each of the tasks to be monitored according to a preset baseline committed time and a warning margin, as well as the dependencies among the plurality of tasks to be monitored.

Wherein when creating a baseline, a user can add a guaranteed task to the baseline, and can also set the baseline committed time and warning margin. The baseline committed time is the latest completion time of the baseline. All tasks to be monitored in the baseline need to be completed before the baseline committed time. If they are not completed before the baseline committed time, the baseline will be broken. The baseline committed time can be set according to the estimated completion time of the baseline, and the estimated completion time of the baseline can be the maximum time among the estimated completion times of all a guaranteed task. The warning margin can be a set buffer duration. The baseline committed time minus the warning margin is the baseline warning completion time. It is expected that all tasks to be monitored can be completed before the baseline warning completion time. If they are not completed before the baseline warning completion time, the baseline is warning. For the baseline, the baseline broken brings more serious impact than the baseline warning.

The check time information corresponding to the task to be monitored may include latest warning start time, latest committed start time, task warning completion time, and task committed completion time.

Wherein the task committed completion time minus the warning margin is the task warning completion time, the task committed completion time minus the average running duration of the task to be monitored is the latest committed start time, the latest committed start time minus the warning margin is the latest warning start time, and the task warning completion time minus the average running duration of the task to be monitored is the latest warning start time. In the present disclosure, the average running duration of the task to be monitored can be determined according to historical running durations except the maximum duration and the minimum duration of a plurality of historical running durations of the task to be monitored. As an example, the plurality of historical running durations may be running durations of the past 15 days. After removing the maximum duration and the minimum duration in the plurality of historical running durations, the average of the remaining historical running durations may be used as the average running duration of the task to be monitored. Since the maximum duration and the minimum duration may be a too long running duration or a too short running duration caused by unstable running of the task to be monitored, the average running duration determined according to the historical running durations except the maximum duration and the minimum duration can avoid the influence of extreme values, enabling the determined average running duration to be more accurate.

As shown in FIG. 2, taking the task to be monitored being a daily task as an example, for example, the preset baseline committed time is 10 o'clock, and the warning margin is 1 hour. When determining the check time information, the check time information of each task to be monitored can be determined by starting from the downstream guaranteed task and traversing from bottom to top according to dependencies among tasks.

Wherein the task committed completion time of task C to be monitored can be 10 o'clock, and the task warning completion time is 9 o'clock. For example, the average running duration of task C to be monitored is 30 min, then the latest warning start time is 8:30, and the latest committed start time is 9:30.

For task A to be monitored, since task C to be monitored depends on the task A to be monitored, and the task C to be monitored can only be executed after the task A to be monitored is successfully executed, the task committed completion time of the task A to be monitored can be the latest committed start time 9:30 of the task C to be monitored, the task warning completion time of task A to be monitored can be the latest warning start time 8:30 of the task C to be monitored. For example, the average running duration of task A to be monitored is 1.5 h, then the latest committed start time of task A to be monitored is 8 o'clock, and the latest warning start time is 7 o'clock.

For task D to be monitored, its task committed completion time may be 8 o'clock, and the task warning completion time is 7 o'clock. For example, the average running duration of task D to be monitored is 20 minutes, then its latest warning start time is 6:40, and the latest committed start time is 7:40.

For task B to be monitored, task A to be monitored and task D to be monitored both depend on the execution of task B to be monitored. In order to enable task A to be monitored to be executed before the latest warning start time of 7 o'clock, the task warning completion time of task B to be monitored needs to be 7 o'clock; in order to enable task D to be monitored to be executed before the latest warning start time of 6:40, the task warning completion time of task B to be monitored needs to be 6:40. In order to ensure that both task A and task D to be monitored can be executed smoothly, the task warning completion time of task B to be monitored can be taken as the earliest time among the latest warning start times of downstream task to be monitored, that is, 6:40. For example, if the average running duration of task B to be monitored is 40 minutes, its latest warning start time is 6 o'clock, the latest committed start time is 7 o'clock, and the task committed completion time is 7:40.

For task E to be monitored, its task committed completion time may be 7 o'clock, and the task warning completion time may be 6 o'clock. For example, the average running duration of task E to be monitored is 30 minutes, then its latest warning start time is 5:30, and the latest committed start time is 6:30.

Figure 3:
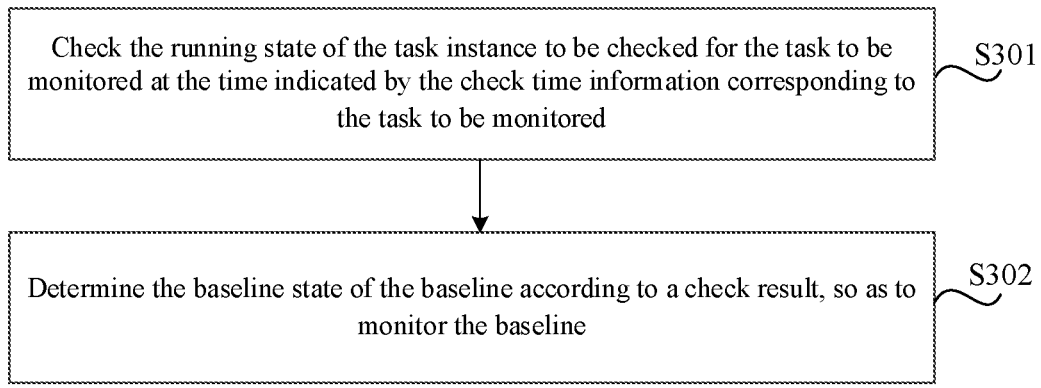
FIG. 3 is a flow chart of a baseline monitoring method according to a task instance to be checked for a task to be monitored according to an exemplary embodiment.

As a result, starting from a guaranteed task and traversing from bottom to top, the check time information corresponding to each task to be monitored can be determined according to the preset baseline committed time and warning margin, as well as the dependencies among tasks. Accordingly, the exemplary implementation of monitoring the baseline according to the task instance to be checked for the task to be monitored in above S104 may be as shown in FIG. 3, including S301 and S302.

In S301, at the time indicated by the check time information corresponding to the task to be monitored, the running state of the task instance to be checked for the task to be monitored is checked. In S302, the baseline state of the baseline is determined according to a check result, so as to monitor the baseline.

As an example, for task A to be monitored, it can be checked whether the task instance on July 25 has started to run at the latest warning start time 7 o'clock and the latest committed start time 8 o'clock on July 26, and it can be checked whether the task instance on July 25 has run successfully at the task warning completion time 8:30 and the task committed completion time 9:30. The check of other tasks to be monitored is similar and will not be repeated here.

Wherein the baseline state may include safe, warning, broken, and other, and a baseline being other state may refer to a state of the baseline when there is no associated task to be monitored or task to be monitored is in closed state. Determining the baseline state according to a check result in S302 may comprise: if the check result indicates that the task instance to be checked has started to run before the latest warning start time, and has run successfully before the task warning completion time, which can indicate that the task instance is running normally, the baseline state can be determined to be the safe state;

If the check result indicates that the task instance to be checked has not started running at the latest warning start time, or the task instance to be checked has not run successfully at the task warning completion time, the baseline state can be determined to be the warning state;

If the check result indicates that the task instance to be checked has not started running at the latest committed start time, or the task instance to be checked has not run successfully at the task committed completion time, the baseline state can be determined to be the broken state.

It is to be noted that there are upstream and downstream dependencies among tasks to be monitored, and the running of each task to be monitored in a baseline has an impact on the status of the entire baseline. As an example, when task E to be monitored is checked, if the check result indicates that the task E to be monitored does not run before the latest warning start time, then because the task E to be monitored runs too late, which will at the same time affect its downstream other tasks to be monitored to run on time, causing its downstream other tasks to be monitored to fail to start running on time, so the baseline state can be determined to be the warning state.

In this way, at the time indicated by the check time information, the running state of the task instance to be checked is checked, and the entire baseline can be monitored through the running state of the task instance.

As shown in FIG. 2, taking the task to be monitored being an hourly task as an example, the baseline committed time is, for example, the 55th minute of an hour, and the warning margin is 5 minutes. For task C to be monitored, for example, its task committed completion time is the 55th minute, and the warning completion time is the 50th minute. If its average running duration is 10 minutes, its latest committed start time is the 45th minute, and the latest warning start time is the 40th minute. Following above example, at 15:40, it can be checked whether the task instance at 14 o'clock for the task C to be monitored has already started running, and if it has not started running, the baseline state can be determined to be the warning state.

For task A to be monitored, if its average running duration is 5 min, then its task committed completion time is the 45th minute, the task warning completion time is the 40th minute, the latest committed start time is the 40th minute, and the latest warning start time is the 35th minute. For example, at 15:35, it can be checked whether the task instance at 14 o'clock for task A to be monitored has already started running. The determination of the check time information of other tasks to be monitored may refer to above description for daily tasks.

In addition, alarm information can also be issued according to a check result. If the baseline state is determined to be a warning state, baseline warning alarm information can be sent to a person in charge of the baseline. If the baseline state is determined to be a broken state, baseline broken alarm information can be sent to the person in charge of the baseline to prompt the person in charge of the baseline of the running state of the baseline in time.

The baseline monitoring method provided by the present disclosure may further comprise: for each of the tasks to be monitored, determining a real-time margin of the task to be monitored according to a current instance state of the task instance to be checked for the task to be monitored; determining a real-time margin of the baseline according to a minimum value of the real-time margin for each task to be monitored; and determining the baseline state of the baseline according to the real-time margin of the baseline.

The real-time margin can indicate the alarming degree of the baseline warning or broken. The current instance state of a task instance may include a waiting execution state, an in-execution state, and an execution failure state. In the present disclosure, task instances in different instance states correspond to different ways of determining real-time margins of tasks to be monitored, and not all tasks to be monitored adopt the same way of determining real-time margins, so that the way of determining adopted corresponds to the instance state, thereby ensuring the accuracy of the determined real-time margin of the task to be monitored.

Wherein in a case that the current instance state of the task instance to be checked is the waiting execution state, the real-time margin of the task to be monitored can be determined according to the current time and the task committed completion time, expected scheduling time, and average running duration of the task to be monitored. The expected scheduling time may be expected time when the task to be monitored is desired to be scheduled. In general, due to the influence of other tasks, actual running time of a task to be monitored will be later than or equal to the expected scheduling time.

As an example, in a case that the instance state of the task instance is the waiting execution state, the real-time margin $T1$ of corresponding task to be monitored can be determined by the following formula:

$$T1 = \text{task committed completion time} - [\max(\text{expected scheduling time}, \text{current time}) + \text{average running duration}]$$

In a case that the current instance state of the task instance to be checked is the in-execution state, the real-time margin of the task to be monitored can be determined according to the current time and the task committed completion time, the actual start execution time, and the average running duration of the task to be monitored. As an example, in a case that the instance state of the task instance is the in-execution state, the real-time margin $T2$ of corresponding task to be monitored can be determined by the following formula:

$$T2 = \text{task committed completion time} - [\max(\text{current time}, \text{actual start execution time} + \text{average running duration})]$$

In a case that the current instance state of the task instance to be checked is the execution failure state, the real-time margin of the task to be monitored can be determined according to the current time and the task committed completion time and the average running duration of the task to be monitored. As an example, in a case that the instance state of the task instance is the execution failure state, the real-time margin $T3$ of corresponding task to be monitored can be determined by the following formula:

$$T3 = \text{task committed completion time} - (\text{current time} + \text{average running duration})$$

Wherein since the state of the baseline is affected by each task to be monitored, the minimum value of the real-time margins of each task to be monitored can be determined as the real-time margin of the baseline, and the baseline status of the baseline can be determined according to the real-time margin of the baseline. If the real-time margin of the baseline is positive and greater than the warning margin, it can indicate that the baseline state is safe, and the larger the value of the real-time margin is, the safer it is; if the real-time margin of the baseline is less than the warning margin, it can indicate that the baseline state is warning state; if the real-time margin of the baseline is negative, it can indicate that the baseline state is broken state, and the smaller the value of the real-time margin is, the higher the degree of broken.

In above technical solution, task instances in different instance states correspond to different ways of determining real-time margins of tasks to be monitored, so that the way of determining adopted corresponds to the instance state, and ensure the accuracy of the determined real-time margin of the task to be monitored, thereby ensuring the accuracy of the baseline state determined according to the real-time margin of the task to be monitored.

The baseline monitoring method provided by the present disclosure may further comprise: in a case that actual running duration of a task to be monitored is greater than the average running duration of the task to be monitored by a preset ratio, determining that the task to be monitored is a task running slowly, wherein if the average running duration is different, the corresponding preset ratio is different.

The task to be monitored may fail to run in the process of running. At this time, an error alarm can be issued for the task to be monitored, and alarm information of the task running error can be sent to the person in charge of the task. In addition, in the process of running of the task to be monitored, there may also occur the running slowly, that is, the actual running duration of the task to be monitored is longer than the average running duration. In the present disclosure, instead of the task to be monitored is considered to be a running slowly task as long as the actual running duration thereof is greater than the average running duration, the task to be monitored is determined to be a running slowly task only when the actual running duration is greater than the average running duration by a preset ratio, in this way, the number of slowing down events can be controlled to a certain extent and unnecessary recording of slowing down events is prevented.

Moreover, in the present disclosure, if the average running duration is different, the corresponding preset ratio may be different, and the corresponding preset ratio may be set according to the average running duration. In one embodiment, correspondences between average running duration and preset ratio may be as shown in Table 1 below:

TABLE 1

| Average running duration | Preset ratio |
|---|---|
| 0 min~10 min | 200% |
| 11 min~60 min | 160% |
| 61 min~120 min | 140% |
| 121 min~180 min | 130% |
| 181 min or more | 120% |

It should be noted that the embodiments shown in Table 1 are exemplary and do not limit the implementations of the present disclosure. As an example, for example, if the average running duration of task C to be monitored is 30 minutes, when the actual running duration of task C to be monitored is greater than or equal to 48 minutes, the task C to be monitored is determined to be a task running slowly.

With above technical solution, a task to be monitored is determined to be a task running slowly only when actual running duration of the task to be monitored is greater than a preset ratio of the average running duration, and if the average running duration is different, the corresponding preset ratio may be different, in this way, the number of slowing down events can be controlled to a certain extent and unnecessary recording of slowing down events is prevented.

Figure 4:
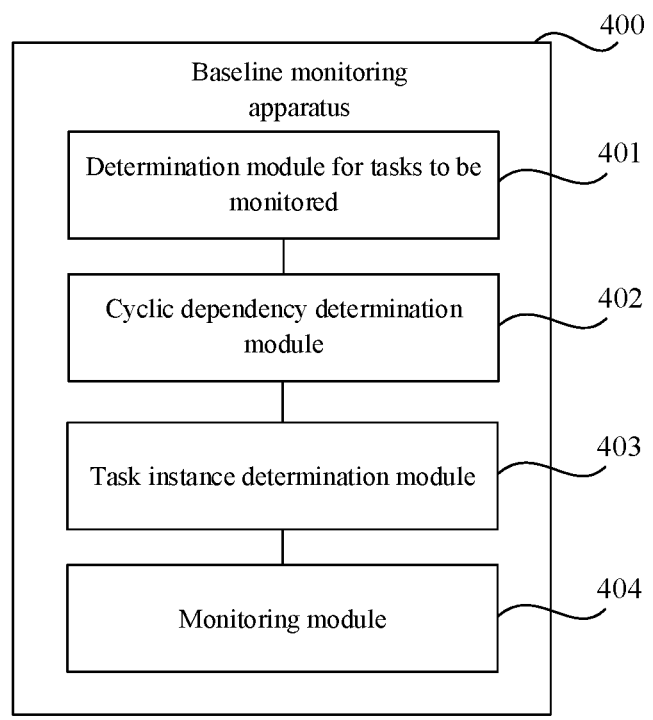
FIG. 4 is a schematic diagram of a baseline monitoring apparatus according to an exemplary embodiment.

Based on the same inventive concept, a baseline monitoring apparatus is also provided in the present disclosure. FIG. 4 is a schematic diagram of a baseline monitoring apparatus according to an exemplary embodiment. As shown in FIG. 4, the apparatus 400 may comprise:
- a determination module for tasks to be monitored 401 configured to determine a plurality of tasks to be monitored in the baseline;
- a cyclic dependency determination module 402 configured to determine whether there is a first task to be monitored that has cyclic dependency according to dependencies among the plurality of tasks to be monitored, wherein the cyclic dependency indicates mutual dependency among the first tasks to be monitored;
- a task instance determination module 403 configured to determine a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added by a user to the baseline;
- a monitoring module 404 configured to, for each of the tasks to be monitored, monitor the baseline according to the task instance to be checked for the task to be monitored.

With above technical solution, according to dependencies among a plurality of tasks to be monitored in a baseline, in a case that it is determined that there is a first task to be monitored that has cyclic dependency, when determining a task instance to be checked for each of the tasks to be monitored, for the first task to be monitored that is not a guaranteed task, the task instance to be checked can be determined according to the cyclic dependency and dependency between the first task to be monitored and downstream task to be monitored. After the task instance to be checked is determined, cycle process between the first task to be monitored can no longer be performed, so as to avoid the cycle dependency from entering a process of continuous circulating. For a second task to be monitored that is not a guaranteed task, the task instance to be checked can be determined according to dependency between the second task to be monitored and a downstream task to be monitored. Wherein the guaranteed task can be tasks added to the baseline by a user. For a guaranteed task, the latest task instance can be determined as the task instance to be checked. For a task to be monitored that is not a guaranteed task, its latest task instance which is depended on can be determined as the task instance to be checked. In this way, only a task instance to be checked is checked, and there is no need to check an earlier task instance repeatedly to avoid repeated check. In addition, the running situation of the task instance to be checked affects the overall status of the baseline, and by checking the task instance to be checked, the baseline can be effectively monitored, so that daily tasks can be effectively operated and maintained to ensure the normal running of tasks and the normal output of transaction data.

Optionally, the task instance determination module 403 may comprise: a first determination sub-module configured to determine a second task instance that depend on the first task to be monitored according to first task instance for its upstream first task to be monitored on which the first task to be monitored depends, and offset information of a dependency offset between the upstream first task to be monitored when it is downstream of the first task to be monitored and the first task to be monitored, wherein the dependency offset means that a task to be monitored depends on the historical execution situation of another task to be monitored; the second determination sub-module configured to determine the latest task instance that depends on the first task instance to be monitored according to the second task instance and a task instance for the first task to be monitored on which its downstream task to be monitored depends, and determining the latest task instance as the task instance to be checked for the first task to be monitored.

Optionally, the task instance determination module 403 may comprise: a third determination sub-module configured to determine the latest task instance for the second task to be monitored which is depended on according to offset information of the dependency offset between the second task to be monitored and its downstream task to be monitored, and taking the latest task instance as the task instance to be checked for the second task to be monitored.

Optionally, the task instance determination module 403 may comprise: a fourth determination sub-module configured to, for the task to be monitored as a guaranteed task, determine the task instance to be checked for the task to be monitored according to the latest task instance for the task to be monitored.

Optionally, the apparatus 400 may further comprise: a check time information determination module configured to determine check time information corresponding to each of the tasks to be monitored according to a preset baseline committed time and a warning margin, as well as the dependencies among the plurality of tasks to be monitored; the monitoring module 404 may comprise: a check sub-module configured to check the running state of the task instance to be checked for the task to be monitored at the time indicated by the check time information corresponding to the task to be monitored; a fifth determination sub-module configured to determine the baseline state of the baseline according to a check result, so as to monitor the baseline.

Optionally, the check time information includes latest warning start time, latest committed start time, task warning completion time, and task committed completion time; the fifth determination sub-module includes: a safe state determination sub-module configured to, if the check result indicates that the task instance has started to run before the latest warning start time, and has run successfully before the task warning completion time, determine the baseline state to be the safe state; a warning state determination sub-module configured to, if the check result indicates that the task instance has not started running at the latest warning start time, or the task instance has not successfully run at the task warning completion time, determine the baseline state to be the warning state; a broken state determination sub-module configured to, if the check result indicates that the task instance has not started running at the committed latest start time, or, the task instance has not run successfully at the task committed completion time, determine the baseline state to be the broken state.

Optionally, the apparatus 400 may further comprise: a task real-time margin determination module configured to, for each of the tasks to be monitored, determine real-time margin of the task to be monitored according to a current instance state of the task instance to be checked for the task to be monitored, wherein task instances in different instance states correspond to different ways of determining real-time margins of tasks to be monitored; a baseline real-time margin determination module configured to determine real-time margin of the baseline according to a minimum value of the real-time margin for each task to be monitored; a baseline state determination module configured to determine the baseline state of the baseline according to the real-time margin of the baseline.

Optionally, the instance state includes a waiting execution state, an in-execution state and an execution failure state; the task real-time margin determination module includes: a first real-time margin determination sub-module configured to, in a case that the current instance state of the task instance is the waiting execution state, determine the real-time margin of the task to be monitored according to the current time and the task committed completion time, expected scheduling time, and average running duration of the task to be monitored; a second real-time margin determination sub-module configured to, in a case that the current instance state of the task instance is the in-execution state, determine the real-time margin of the task to be monitored according to the current time and the task committed completion time, the actual start execution time, and the average running duration of the task to be monitored; a third real-time margin determination sub-module configured to, in a case that the current instance state of the task instance is the execution failure state, determine the real-time margin of the task to be monitored according to the current time and the task committed completion time and the average running duration of the task to be monitored.

Optionally, the apparatus 400 further comprises: a slowing down task determination module configured to, in a case that the actual running duration of the task to be monitored is greater than a preset ratio of the average running duration of the task to be monitored, determine the task to be monitored to be a task running slowly, wherein different average running durations correspond to different preset ratios.

Regarding the apparatus in the above embodiments, the specific manner in which each module performs running has been described in detail in the method embodiments, which will not be described in detail here.

Figure 5:
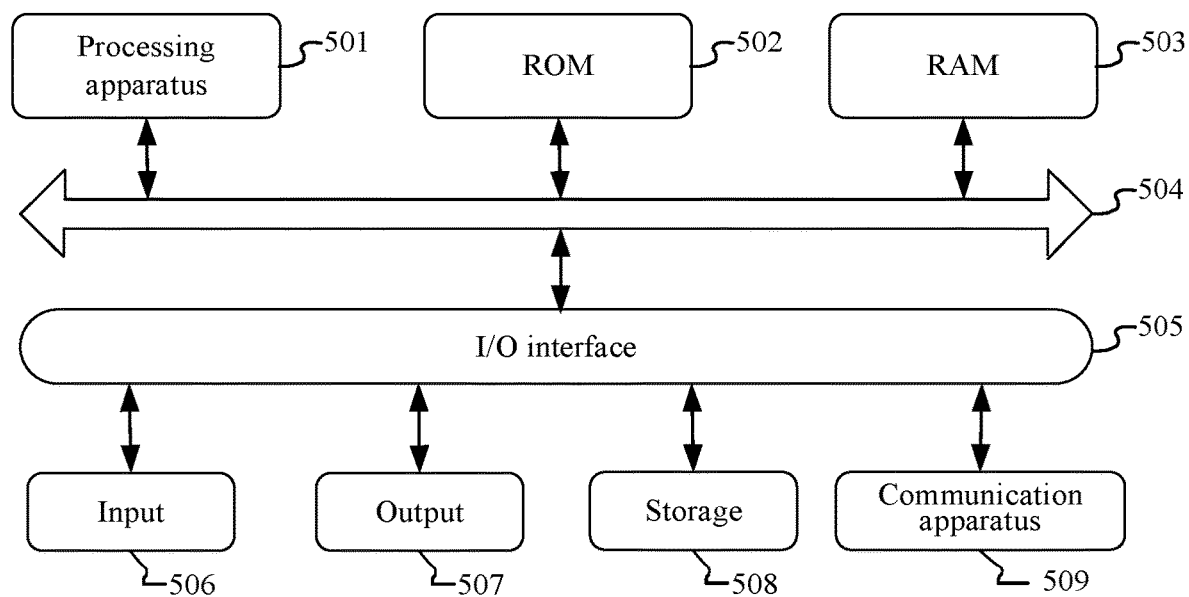
FIG. 5 is a schematic structural diagram of an electronic device according to an exemplary embodiment.

Referring to FIG. 5 below, it shows a schematic structural diagram suitable for implementing an electronic device 500 in an embodiment of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 5 is only an example, and should not bring any limitation to functions and usage scopes of embodiments of the present disclosure.

As shown in FIG. 5, the electronic device 500 may include a processing apparatus (for example a central processing unit, a graphics processor, etc.) 501, which can execute various appropriate actions and processes according to a program stored in a read-only memory (ROM) 502 or a program loaded from a storage 508 into a random access memory (RAM) 503. In the RAM 503, various programs and data required for the running of the electronic device 500 are also stored. The processing apparatus 501, ROM 502, and RAM 503 are connected to each other through a bus 504. An input/output (I/O) interface 505 is also connected to the bus 504.

Generally, the following apparatus can be connected to the I/O interface 505: an input 506 including for example, a touch screen, a touch pad, a keyboard, a mouse, a camera, a microphone, an accelerometer, a gyroscope, etc.; an output 507 including for example, a liquid crystal display (LCD), a speaker, a vibrator, etc.; a storage 508 including for example, a magnetic tape, a hard disk, etc.; and a communication apparatus 509. The communication apparatus 509 may allow the electronic device 500 to perform wireless or wired communication with other devices to exchange data. Although FIG. 5 shows an electronic device 500 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 509, or installed from the storage 508, or installed from the ROM 502. When the computer program is executed by the processing apparatus 501, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, causes the electronic device to: determine a plurality of tasks to be monitored in the baseline; determine whether there is a first task to be monitored that has cyclic dependency according to dependencies among the plurality of tasks to be monitored, wherein the cyclic dependency indicates mutual dependency among the first tasks to be monitored; determine a task instance to be checked for each of the tasks to be monitored, wherein in presence of the first task to be monitored that has cyclic dependency, for the first task to be monitored that is not a guaranteed task, determine the task instance to be checked for the first task to be monitored according to the cyclic dependency and dependency between the first task to be monitored and its downstream task to be monitored, and for a second task to be monitored that is not the guaranteed task, determine the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and for each of the tasks to be monitored, monitor the baseline according to the task instance to be checked for the task to be monitored.

The computer program code for performing the running of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and running implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified function or running, or it can be implemented by a combination of dedicated hardware and computer instructions.

The modules involved in the embodiments of the present disclosure can be implemented in software or hardware. Wherein the name of the module does not constitute a limitation on the module itself under certain circumstances, for example, the module for determining tasks to be monitored may also be described as a "determination module".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a baseline monitoring method, comprising: determining a plurality of tasks to be monitored in the baseline; determining whether there is a first task to be monitored that has cyclic dependency according to dependencies among the plurality of tasks to be monitored, wherein the cyclic dependency indicates mutual dependency among the first tasks to be monitored; determining a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and for each of the tasks to be monitored, monitoring the baseline according to the task instance to be checked for the task to be monitored.

According to one or more embodiments of the present disclosure, Example 2 provides the method of Example 1, wherein the determining the task instance to be checked for the first task to be monitored according to the cyclic dependency and dependency between the first task to be monitored and its downstream task to be monitored includes: determining a second task instance which is depended on for the first task to be monitored according to first task instance for its upstream first task to be monitored on which the first task to be monitored depends, and offset information of a dependency offset between the upstream first task to be monitored when it is downstream of the first task to be monitored and the first task to be monitored, wherein the dependency offset means that a task to be monitored depends on the historical execution situation of another task to be monitored; and determining a latest task instance which is depended on for the first task to be monitored according to the second task instance and a task instance for the first task to be monitored on which its downstream task to be monitored depends, and determining the latest task instance as the task instance to be checked for the first task to be monitored.

According to one or more embodiments of the present disclosure, Example 3 provides the method of Example 1, wherein the determining the task instance to be checked for the second task to be monitored according to dependency between the second task to be monitored and its downstream task to be monitored includes: determining the latest task instance for the second task to be monitored which is depended on according to offset information of the dependency offset between the second task to be monitored and its downstream task to be monitored, and taking the latest task instance as the task instance to be checked for the second task to be monitored.

According to one or more embodiments of the present disclosure, Example 4 provides the method of Example 1, wherein the determining a task instance to be checked for each of the tasks to be monitored includes: for the task to be monitored as a guaranteed task, determining the task instance to be checked for the task to be monitored according to the latest task instance for the task to be monitored.

According to one or more embodiments of the present disclosure, Example 5 provides the method of Example 1, the method further comprising: determining check time information corresponding to each of the tasks to be monitored according to a preset baseline committed time and a warning margin, as well as the dependencies among the plurality of tasks to be monitored; the monitoring of the baseline according to the task instance to be checked for the task to be monitored includes: checking the running state of the task instance to be checked for the task to be monitored at the time indicated by the check time information corresponding to the task to be monitored; and determining the baseline state of the baseline according to a check result, so as to monitor the baseline.

According to one or more embodiments of the present disclosure, Example 6 provides the method of Example 5, wherein the check time information includes latest warning start time, latest committed start time, task warning completion time, and task committed completion time; the determining the baseline state of the baseline according to a check result includes: if the check result indicates that the task instance has started to run before the latest warning start time, and has run successfully before the task warning completion time, determining the baseline state to be a safe state; if the check result indicates that the task instance has not started running at the latest warning start time, or the task instance has not successfully run at the task warning completion time, determining the baseline state to be a warning state; and if the check result indicates that the task instance has not started running at the committed latest start time, or, the task instance has not run successfully at the task committed completion time, determining the baseline state to be a broken state.

According to one or more embodiments of the present disclosure, Example 7 provides the method of Example 1, the method further comprising: for each of the tasks to be monitored, determining a real-time margin of the task to be monitored according to a current instance state of the task instance to be checked for the task to be monitored, wherein task instances in different instance states correspond to different ways of determining real-time margins of tasks to be monitored; determining a real-time margin of the baseline according to a minimum value of the real-time margin for each task to be monitored; and determining the baseline state of the baseline according to the real-time margin of the baseline.

According to one or more embodiments of the present disclosure, Example 8 provides the method of Example 7, wherein the instance state includes a waiting execution state, an in-execution state and an execution failure state; the determining the real-time margin of the task to be monitored according to a current instance state of the task instance to be checked for the task to be monitored includes: in a case that the current instance state of the task instance is the waiting execution state, determining the real-time margin of the task to be monitored according to the current time and the task committed completion time, expected scheduling time, and average running duration of the task to be monitored; in a case that the current instance state of the task instance is the in-execution state, determining the real-time margin of the task to be monitored according to the current time and the task committed completion time, the actual start execution time, and the average running duration of the task to be monitored; and in a case that the current instance state of the task instance is the execution failure state, determining the real-time margin of the task to be monitored according to the current time and the task committed completion time and the average running duration of the task to be monitored.

According to one or more embodiments of the present disclosure, Example 9 provides the method of Example 1, the method further comprising: in a case that the actual running duration of the task to be monitored is greater than a preset ratio of the average running duration of the task to be monitored, determining the task to be monitored to be a task running slowly, wherein different average running durations correspond to different preset ratios.

According to one or more embodiments of the present disclosure, Example 10 provides the method of Example 8 or Example 9, wherein the average running duration is determined according to the historical running durations except the maximum duration and the minimum duration of a plurality of historical running durations of the task to be monitored.

According to one or more embodiments of the present disclosure, Example 11 provides a baseline monitoring apparatus, comprising: a determination module for tasks to be monitored configured to determine a plurality of tasks to be monitored in the baseline; a cyclic dependency determination module configured to determine whether there is a first task to be monitored that has cyclic dependency according to dependencies among the plurality of tasks to be monitored, wherein the cyclic dependency indicates mutual dependency among the first tasks to be monitored; a task instance determination module configured to determine a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added by a user to the baseline; and a monitoring module configured to, for each of the tasks to be monitored, monitor the baseline according to the task instance to be checked for the task to be monitored.

According to one or more embodiments of the present disclosure, Example 12 provides a computer-readable medium with a computer program stored thereon, which, when executed by a processing apparatus, implements the steps of the method of any of Examples 1 to 10.

According to one or more embodiments of the present disclosure, Example 13 provides an electronic device, comprising: a storage apparatus with a computer program stored thereon; and a processing apparatus configured to execute the computer program in the storage apparatus, to implement the steps of the method of any of Examples 1 to 10.

According to one or more embodiments of the present disclosure, Example 14 provides a computer program comprising: instructions, which, when executed by a processor, cause the processor to perform the steps of the method of any of Examples 1 to 10.

According to one or more embodiments of the present disclosure, Example 15 provides a computer program product comprising instructions, which, when executed by a processor, cause the processor to perform the steps of the method of any of Examples 1 to 10.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various running are depicted in a specific order, this should not be understood as requiring these running to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs running has been described in detail in the method embodiments, which will not be described in detail here.

What is claimed is:

1. A baseline monitoring method, comprising:
   determining a plurality of tasks to be monitored in a baseline;
   determining whether there is a first task to be monitored that has cyclic dependency according to dependencies among the plurality of tasks to be monitored, wherein the cyclic dependency indicates mutual dependency among the first tasks to be monitored;
   determining a task instance to be checked for each of the tasks to be monitored, wherein in presence of the first task to be monitored that has cyclic dependency, for the first task to be monitored that is not a guaranteed task, determining the task instance to be checked for the first task to be monitored according to the cyclic dependency and dependency between the first task to be monitored and its downstream task to be monitored, and for a second task to be monitored that is not the guaranteed task, determining the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and
   for each of the tasks to be monitored, monitoring the baseline according to the task instance to be checked for the task to be monitored.

2. The baseline monitoring method of claim 1, wherein the determining the task instance to be checked for the first task to be monitored according to the cyclic dependency and dependency between the first task to be monitored and its downstream task to be monitored includes:
   determining a second task instance which is depended on for the first task to be monitored according to a first task instance for its upstream first task to be monitored on which the first task to be monitored depends, and offset information of a dependency offset between the upstream first task to be monitored when it is downstream of the first task to be monitored and the first task to be monitored, wherein the dependency offset represents that a task to be monitored depends on historical execution situation of another task to be monitored; and
   determining a latest task instance which is depended on for the first task to be monitored according to the second task instance and a task instance for the first task to be monitored on which its downstream task to be monitored depends, and determining the latest task instance as the task instance to be checked for the first task to be monitored.

3. The baseline monitoring method of claim 1, wherein the determining the task instance to be checked for the second task to be monitored according to dependency between the second task to be monitored and its downstream task to be monitored includes:
   determining a latest task instance for the second task to be monitored which is depended on according to offset information of a dependency offset between the second task to be monitored and its downstream task to be monitored, and taking the latest task instance as the task instance to be checked for the second task to be monitored.

4. The baseline monitoring method of claim 1, wherein the determining the task instance to be checked for each of the tasks to be monitored includes:
   for the task to be monitored as a guaranteed task, determining the task instance to be checked for the task to be monitored according to a latest task instance for the task to be monitored.

5. The baseline monitoring method of claim 1, further comprising:
   determining check time information corresponding to each of the tasks to be monitored according to a preset baseline committed time and a warning margin, as well as the dependencies among the plurality of tasks to be monitored;
   the monitoring of the baseline according to the task instance to be checked for the task to be monitored includes:
   checking a running state of the task instance to be checked for the task to be monitored at a time indicated by the check time information corresponding to the task to be monitored; and
   determining a baseline state of the baseline according to a check result, so as to monitor the baseline.

6. The baseline monitoring method of claim 5, wherein the check time information includes a latest warning start time, a latest committed start time, a task warning completion time, and a task committed completion time;
   the determining the baseline state of the baseline according to the check result includes:
   if the check result indicates that the task instance has started to run before the latest warning start time, and has run successfully before the task warning completion time, determining the baseline state to be a safe state;
   if the check result indicates that the task instance has not started running at the latest warning start time, or the task instance has not successfully run at the task warning completion time, determining the baseline state to be a warning state; and
   if the check result indicates that the task instance has not started running at the committed latest start time, or the task instance has not run successfully at the task committed completion time, determining the baseline state to be a broken state.

7. The baseline monitoring method of claim 1, further comprising:
   for each of the tasks to be monitored, determining a real-time margin of the task to be monitored according to a current instance state of the task instance to be checked for the task to be monitored, wherein task instances in different instance states correspond to different ways of determining real-time margins of tasks to be monitored;
   determining a real-time margin of the baseline according to a minimum value of the real-time margin for each task to be monitored; and
   determining the baseline state of the baseline according to the real-time margin of the baseline.

8. The baseline monitoring method of claim 7, wherein the instance state includes a waiting execution state, an in-execution state and an execution failure state;
   the determining the real-time margin of the task to be monitored according to the current instance state of the task instance to be checked for the task to be monitored includes:
   in a case that the current instance state of the task instance is the waiting execution state, determining the real-time margin of the task to be monitored according to a current time and the task committed completion time, an expected scheduling time, and an average running duration of the task to be monitored;

in a case that the current instance state of the task instance is the in-execution state, determining the real-time margin of the task to be monitored according to the current time and the task committed completion time, the actual start execution time, and the average running duration of the task to be monitored; and in a case that the current instance state of the task instance is the execution failure state, determining the real-time margin of the task to be monitored according to the current time and the task committed completion time and the average running duration of the task to be monitored.

9. The baseline monitoring method of claim 1, further comprising:

in a case that an actual running duration of the task to be monitored is greater than a preset ratio of an average running duration of the task to be monitored, determining the task to be monitored to be a task running slowly, wherein different average running durations correspond to different preset ratios.

10. The baseline monitoring method of claim 8, wherein the average running duration is determined according to historical running durations except a maximum duration and a minimum duration of a plurality of historical running durations of the task to be monitored.

11. The baseline monitoring method of claim 9, wherein the average running duration is determined according to historical running durations except a maximum duration and a minimum duration of a plurality of historical running durations of the task to be monitored.

12. A non-transitory computer-readable medium with a computer program stored thereon, which, when executed by a processing apparatus, causes the processing apparatus to:

determine a plurality of tasks to be monitored in a baseline;

determine whether there is a first task to be monitored that has cyclic dependency according to dependencies among the plurality of tasks to be monitored, wherein the cyclic dependency indicates mutual dependency among the first tasks to be monitored;

determine a task instance to be checked for each of the tasks to be monitored, wherein in presence of the first task to be monitored that has cyclic dependency, for the first task to be monitored that is not a guaranteed task, determine the task instance to be checked for the first task to be monitored according to the cyclic dependency and dependency between the first task to be monitored and its downstream task to be monitored, and for a second task to be monitored that is not the guaranteed task, determine the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and for each of the tasks to be monitored, monitor the baseline according to the task instance to be checked for the task to be monitored.

13. The medium of claim 12, wherein the computer program causes the processing apparatus to determine the task instance to be checked for the first task to be monitored according to the cyclic dependency and dependency between the first task to be monitored and its downstream task to be monitored by:

determining a second task instance which is depended on for the first task to be monitored according to a first task instance for its upstream first task to be monitored on which the first task to be monitored depends, and offset information of a dependency offset between the upstream first task to be monitored when it is downstream of the first task to be monitored and the first task to be monitored, wherein the dependency offset represents that a task to be monitored depends on historical execution situation of another task to be monitored; and determining a latest task instance which is depended on for the first task to be monitored according to the second task instance and a task instance for the first task to be monitored on which its downstream task to be monitored depends, and determining the latest task instance as the task instance to be checked for the first task to be monitored.

14. The medium of claim 12, wherein the computer program causes the processing apparatus to determine the task instance to be checked for the second task to be monitored according to dependency between the second task to be monitored and its downstream task to be monitored by:

determining a latest task instance for the second task to be monitored which is depended on according to offset information of a dependency offset between the second task to be monitored and its downstream task to be monitored, and taking the latest task instance as the task instance to be checked for the second task to be monitored.

15. The medium of claim 12, wherein the computer program causes the processing apparatus to determine the task instance to be checked for each of the tasks to be monitored by:

for the task to be monitored as a guaranteed task, determining the task instance to be checked for the task to be monitored according to a latest task instance for the task to be monitored.

16. The medium of claim 12, wherein the computer program further causes the processing apparatus to:

determine check time information corresponding to each of the tasks to be monitored according to a preset baseline committed time and a warning margin, as well as the dependencies among the plurality of tasks to be monitored;

wherein the computer program causes the processing apparatus to monitor of the baseline according to the task instance to be checked for the task to be monitored by:

checking a running state of the task instance to be checked for the task to be monitored at a time indicated by the check time information corresponding to the task to be monitored; and determining a baseline state of the baseline according to a check result, so as to monitor the baseline.

17. An electronic device comprising:

a processor; and a storage apparatus storing a computer program that upon execution by the processor causes the processor to:

determine a plurality of tasks to be monitored in a baseline;

determine whether there is a first task to be monitored that has cyclic dependency according to dependencies among the plurality of tasks to be monitored, wherein the cyclic dependency indicates mutual dependency among the first tasks to be monitored;

determine a task instance to be checked for each of the tasks to be monitored, wherein in presence of the first task to be monitored that has cyclic dependency, for the first task to be monitored that is not a guaranteed task, determine the task instance to be checked for the first task to be monitored according to the cyclic dependency and dependency between the first task to be monitored and its downstream task to be monitored, and for a second task to be monitored that is not the guaranteed task, determine the task instance to be checked for the second task to be monitored according to dependency between the second task to be monitored and its downstream task to be monitored, wherein the second task to be monitored is a task to be monitored except the first task to be monitored, and the guaranteed task is a task added to the baseline by a user; and for each of the tasks to be monitored, monitor the baseline according to the task instance to be checked for the task to be monitored.

18. The electronic device of claim 17, wherein the computer program causes the processor to determine the task instance to be checked for the first task to be monitored according to the cyclic dependency and dependency between the first task to be monitored and its downstream task to be monitored by:

determining a second task instance which is depended on for the first task to be monitored according to a first task instance for its upstream first task to be monitored on which the first task to be monitored depends, and offset information of a dependency offset between the upstream first task to be monitored when it is downstream of the first task to be monitored and the first task to be monitored, wherein the dependency offset represents that a task to be monitored depends on historical execution situation of another task to be monitored; and determining a latest task instance which is depended on for the first task to be monitored according to the second task instance and a task instance for the first task to be monitored on which its downstream task to be monitored depends, and determining the latest task instance as the task instance to be checked for the first task to be monitored.

19. The electronic device of claim 17, wherein the computer program causes the processor to determine the task instance to be checked for the second task to be monitored according to dependency between the second task to be monitored and its downstream task to be monitored by:

determining a latest task instance for the second task to be monitored which is depended on according to offset information of a dependency offset between the second task to be monitored and its downstream task to be monitored, and taking the latest task instance as the task instance to be checked for the second task to be monitored.

20. The electronic device of claim 17, wherein the computer program causes the processor to determine the task instance to be checked for each of the tasks to be monitored by:

for the task to be monitored as a guaranteed task, determining the task instance to be checked for the task to be monitored according to a latest task instance for the task to be monitored.

* * * * *